US006320642B1

(12) United States Patent
Ogawa et al.

(10) Patent No.: US 6,320,642 B1
(45) Date of Patent: *Nov. 20, 2001

(54) HEAT DEVELOPMENT APPARATUS

(75) Inventors: Masaharu Ogawa; Nobuyuki Torisawa, both of Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/371,501

(22) Filed: Aug. 10, 1999

(30) Foreign Application Priority Data

| | | |
|---|---|---|
| Aug. 13, 1998 | (JP) | 10-228994 |
| Mar. 4, 1999 | (JP) | 11-057293 |

(51) Int. Cl.[7] .......... G03B 27/32; G03G 15/04; G03G 15/08; G03G 15/20; G03G 21/00

(52) U.S. Cl. .......... 355/27; 399/119; 399/252; 399/335; 399/357; 399/338

(58) Field of Search .......... 355/27; 399/94, 399/98, 119, 122, 123, 222, 252, 320, 327, 335, 337, 338, 357; 430/350

(56) References Cited

U.S. PATENT DOCUMENTS

| | | | | |
|---|---|---|---|---|
| 3,709,472 | * | 1/1973 | Kreitz et al. | 432/60 |
| 4,805,690 | * | 2/1989 | Minami et al. | 165/89 |
| 5,411,825 | * | 5/1995 | Tam | 430/41 |
| 5,414,488 | * | 5/1995 | Fujita et al. | 355/30 |
| 5,465,146 | * | 11/1995 | Higashi et al. | 355/285 |
| 5,606,159 | * | 2/1997 | Kurihara | 235/438 |
| 5,774,204 | * | 6/1998 | Suzuki et al. | 355/27 |
| 5,800,968 | * | 9/1998 | Furukawa | 430/350 |
| 5,893,003 | * | 4/1999 | Allen | 396/575 |
| 5,970,301 | * | 10/1999 | De Cock | 399/341 |
| 5,975,772 | * | 11/1999 | Imai et al. | 396/575 |
| 5,987,295 | * | 11/1999 | Matsuo et al. | 399/330 |
| 6,007,971 | * | 12/1999 | Star et al. | 430/350 |

* cited by examiner

*Primary Examiner*—Russell Adams
*Assistant Examiner*—Rodney Fuller
(74) *Attorney, Agent, or Firm*—Sughrue, Mion, Zinn, Macpeak & Seas, PLLC

(57) ABSTRACT

A cooling section 400 for cooling a recording material A, which is a recording material, is disposed in a downstream portion of a heat development section 18. The cooling section 400 has a pair structure consisting of a metal roller 404 and a roller 402 made of an elastic material. The metal roller 404 having excellent heat conductivity is brought into contact with an image forming surface of the recording material A. As a result of the foregoing structure, the recording material A subjected to the heat development can uniformly be cooled to a temperature not higher than a development interruption temperature during conveyance in the cooling section 400. The metal roller may be modified variously. For example, the metal roller is cooled by a cooling mechanism or replaced by a belt.

25 Claims, 15 Drawing Sheets

HEAT DEVELOPMENT APPARATUS

BACKGROUND OF THE INVENTION

1. Field of the Invention

The present invention relates to a heat development apparatus for recording an image on a dry recording material, and more particularly to a structure of a cooling section for cooling a recording material heated by a heat development section for subjecting to a heat treatment, the recording material on which a latent image has been formed.

2. Description of the Related Art

An image recording apparatus or recording a medical image for use in a digital radiography system, a CT, an MR or the like which uses a heat accumulating fluorescent sheet is known. The foregoing apparatus employs a wet system for obtaining a reproduced image by performing a wet process after an image has been photographed or recorded on a silver-salt photographic photosensitive material.

In recent years, a recording apparatus has attracted attention which employs a dry system in which the wet process is not performed. The foregoing recording apparatus is arranged to use a photosensitive and/or thermo-sensitive recording material or a film made of a heat development photosensitive material (hereinafter called "recording materials"). In the recording apparatus using the dry system, the recording material is irradiated (scanned) with a laser beam in an exposing section so that a latent image is formed. Then, the recording material is, in a heat development section, brought into contact with a heating means so that heat development is performed. Then, the recording material on which an image has been formed is discharged to the outside of the apparatus.

The dry system of the foregoing type is able to form an image in a shorter time as compared with the wet process. Moreover, the problem of a necessity of disposal of waste liquid produced in the wet process can be overcome. Therefore, increase in the demand of the dry system is expected.

FIG. 1 shows a conventional heat development apparatus. A cooling section 400 indicated with a dashed line in a heat development apparatus 10 is a portion added according to the present invention.

Referring to FIG. 1, the image forming apparatus 10 is an apparatus arranged to use a heat development photosensitive material (hereinafter called a "recording material A") which does not require the wet development process. Moreover, scanning exposure using laser beam L is performed to expose the recording material A to correspond to a required image so that a latent image is formed. Then, heat development is performed so that a visible image is obtained. The image forming apparatus 10 comprises a recording-material supply section 12, a width aligning section 14, an image exposing section 16 and a heat development section 18 disposed in this order in a direction in which the recording material A is conveyed.

The recording-material supply section 12 has two sections 80 having inside portions 22 and 24 to permit selective use of the recording materials A (for example, B4-size recording materials or half-cut recording materials) set in the foregoing sections through magazines 100. The recording material A is a recording material on which an image is recorded (exposed) by the laser beam L and which is developed with heat to develop color. In accordance with a print command, an uppermost recording material A in the magazine 100 selected by suction cups 26 and 28 structured to suck each sheet in a state in which the cover of the magazine is opened is taken out. Then, the recording material A is guided by paired supply rollers 30 and 32, paired conveying rollers 34 and 36 and conveying guides 38, 40 and 42 disposed downstream in the conveying direction so as to be conveyed to the width aligning section 14.

The width aligning section 14 aligns the position of the recording material A with a direction (hereinafter called a "widthwise direction") perpendicular to the conveying direction. In the downstream image exposing section 16, the width aligning section 14 performs alignment of the recording material A in the main scanning direction, that is, so-called side regist. Then, a conveying roller pair 44 conveys the recording material A to the downstream image exposing section 16.

The downstream image exposing section 16 uses a laser beam to expose the recording material A to correspond to the image the image exposing section 16 incorporating an exposing unit 46 and a sub-scan conveying means 48.

FIG. 2 shows an example of the image exposing section 16.

Referring to FIG. 2, the image exposing section 16 incorporates:

(1) a first laser-beam source 50 having a semiconductor laser 50*a* for emitting laser beam L0 having a wavelength serving as a reference for a recording operation, a collimater lens 50*b* for converting the laser beams into a parallel luminous flux and a cylindrical lens 50*c;* and (2) a second laser-beam source 200 having a second semiconductor laser unit 200*a* for emitting laser beam L1 in a direction perpendicular to the direction of the optical axis of the first laser-beam source 50 and having a different wavelength from that of the first laser beam, a collimater leans 200*b* and a cylindrical lens 200*c*.

Light emitted from each of the laser-beam sources 50 and 200 is allowed to pass through a polarizing beam splitter 202 so as to be formed into superimposed beams having the same phase. Then, the beams are allowed to pass through a reflecting mirror 204 so as to be made incident on a polygonal mirror 54. When the polygonal mirror 54 is rotated, the laser beam is applied in a main scanning direction b through a fθ lens 56 and a cylindrical mirror 58 while the laser beam is being polarized.

In response to an input image signal, a control unit (not shown) operates a driver 52 so as to rotate a conveying motor 206 provided for a polygonal mirror (a rotative polygonal mirror) 54 and a roller pair 60,62. Thus, while the recording material A is being scanned in the main scanning direction b with the laser beam, the recording material A is conveyed in a sub-scanning direction a.

As a result, while the recording material A is being sequentially conveyed in the sub-scanning direction by the conveying motor 206 provided for the roller pair 60,62, a latent image having a predetermined outline is formed on the surface of the recording material A in the main scanning direction.

As described above, the first laser beam and the second laser beam, which is emitted in a direction perpendicular to the optical direction of the first laser beam and having a different wavelength are used. Thus, generation of interference fringes caused from reflection of the laser beam in the layer occurring owning to a thin thickness of an Em (emulsion) can be prevented. As a result, a latent image having a clear outline can be formed on the surface of the recording material A.

Referring again to FIG. 1, then, the recording material A caused to have the latent image formed by the image exposing section 16 shown in FIG. 2 is conveyed to the heat development section 18 by conveying roller pairs 64, 66 and 132. The heat development section 18 is a section for heating the recording material A to perform the heat development to convert the latent image into a visible image. A plate heater 320 accommodated in the heat development section 18 includes a heating member which is a plate-like heating member including a heating member, such as a nichrome wire, which is laid flatly. Thus, the development temperature for the recording material A is maintained. As shown in the drawing, the plate heater 320 projects upwards. Moreover, there are provided a supply roller 326 serving as a conveying means for relatively moving the recording material A with respect to the plate heater 320 while making, contact the recording material A with the surface of the plate heater 320; and a pressing roller 322 which transmits heat from the plate heater 320 to the recording material A and disposed adjacent to the lower surface oft the plate heater 320. Moreover, a heat insulating cover 325 for maintaining the temperature is disposed opposite to the plate heater 320 of the pressing roller 322.

As a result of the foregoing structure, the recording material A passes through a space between the pressing roller 322 and the plate heater 320 by dint of the conveying rotations of the supply roller 326. Then, the heat treatment is performed so that the recording material A is developed with heat. Then, the exposure process is performed so that the recorded latent image is converted into a visible image. Since the conveyance is performed such that the leading end is pressed against the plate heater 320, buckling of the recording material A can be prevented.

The recording material A discharged from the heat development section 18 is, by a conveying roller pair 140, guided to a guide plate 142. Then, the recording materials A are accumulated in a tray 146 from the discharge roller pair 144.

The heat development photosensitive material, which is the recording material A, incorporates a surface protective layer for protecting an image forming layer and preventing adhesion; the Em (emulsion) layer; a support-member layer (usually made of PET); and a back layer (and an AH (antihallation) layer in some cases).

The Em layer is an image forming layer formed on the surface of the support-member layer on which the laser beam L is made incident and which contains a binder composed of latex at a ratio of 50% or higher and a reducing agent which is organic silver salt. When the image forming, layer is exposed to incident laser beam L, a photocatalyst, such as photosensitive silver halide, forms a core for a latent image. When the core of the latent image is heated, the action of the reducing agent moves silver of the ionized organic silver salt so as to be bonded with the photosensitive silver halide and formed into crystal silver with which an image is formed. As the organic silver salt, silver salt of an organic acid, preferably silver salt of long-chain fatty carboxylic acid having 10 to 30 carbon atoms and organic or inorganic silver salt, the ligant of which has a stability factor coefficient of complex of 4.0 to 10.0 are exemplified. Specifically, the following materials are exemplified: silver salt of behenic acid, silver salt of arachidic acid, silver stearate, silver olerate, silver laurate, silver caproate, silver myristate. silver palmitate, silver maleate, silver fumarate, silver tartrate, silver linoleate, silver butyrate and silver camphorate. The image forming layer of the recording material contains a material, for example, photosensitive silver halide (hereinafter called "silver halide) which is converted into a photocatalyst after it has been exposed to light.

The image forming layer of the recording material or another layer on the same surface of the image forming layer may contain an additive which is known as a tone adjuster in a preferred quantity of 0.1 mol % to 50 mol % with respect to one mol of silver to raise the optical density. Note that the tone adjuster may be a precursor induced to have an effective function only when the development process is performed. The tone adjuster may be any one of a variety of known tone adjusters for use in the recording material. Specifically, the following materials are exemplified: a phthalimide compound, such as phthalimide or N-hydroyphthalimide; cyclic imide, such as succinimide, pyrazoline-5-on; naphthalic imide, such as N-hydroxy-1,8-naphthalic imide: cobalt complex, such as cobalt hexamine trifluoroacetate; mercaptan, such as 3-mercapto-1,2,4-triazole or 2,4-dimercaptopyrimidine; phthalazinone derivatie, such as 4-(1-naphtyl) phthalazinon; and its metal salt. The foregoing tone adjuster is added to the solution, which must be applied, as solution, powder or dispersed solid particles.

The sensitizing coloring matter must be capable of spectrosensitizing silver halide in a required wavelength region when the sensitizing coloring matter has been adsorbed to silver halide particles. To add the sensitizing color matter to the silver halide emulsion, it may directly be dispersed in the emulsion or it may be dissolved in single or a mixed solution of water, methanol, ethanol, N,N-dimethylformamide or the like, followed by adding the solution to the emulsion.

The surface protective layer is formed by an adhesion preventive material exemplified by wax, silica particles, elastomer-type block copolymer containing styrene (styrene-butadiene-styrene or the like), cellulose acetate, cellulose acetate butylate and cellulose propionate.

It is preferable that the antihallation (AH) layer is a layer, the maximum absorption of which is 0.3 to 2 in a required wavelength range and absorption of which is 0.001 to 0.5 in a visible region after the process has been completed. When the halation preventive dye is employed, any compound capable of satisfying the following requirement may be employed: the dye must be capable of performing required absorption in the wavelength and; the absorption must sufficiently be restrained in the visible region after the process has been completed; and a preferred absorbance spectrum shape for the antihalation layer can be obtained. Although the following materials are exemplified, the material is not limited to the following materials. As single dye, compounds disclosed in Japanese Patent Laid-Open No. 7-11432 and Japanese Patent Laid-Open No. 7-13295 are exemplified. As dyes which perform decoloration by carrying out processes, compounds disclosed in Japanese Patent Laid-Open No. 52-139136 and Japanese Patent Laid-Open No. 7-199409 are exemplified. It is preferable that the foregoing recording material has the image forming layer on either surface of the support member and a back layer on another surface.

To improve conveyance ease, a matting agent may be added to the back layer. In general, the matting agent is in the form of particles of organic or inorganic compound which is dissoluble in water. The preferred organic compound is exemplified by water dissoluble vinyl polymer, such as polymethylacrylate, methyl cellulose, carboxy starch and carboxy nitrophenyl starch. The preferred inorganic compound is exemplified by silicon dioxide, titanium dioxide, magnesium dioxide, aluminum oxide and barium sulfate.

The binder for forming the back layer may be any one of a variety of colorless, transparent or semitransparent resins.

The resin is exemplified by gelatin, arabic rubber, polovinyl alcohol, hydroxyethyl cellulose, cellulose acetate, cellulose acetate butylate, casein, starch, poly (metha) acrylate, polymethylmethacrylate and polyvinyl chloride.

It is preferable that the back layer is a layer, the maximum absorption is 0.3 to 2 in a required wavelength range. If necessary, the halation preventive dye for use in the foregoing antihallation layer may be added to the back layer.

Since the recording, material A contains the various chemical substances, a variety of fat and oil components are vaporized from the recording material A with heat generated by the heat development section 18. The foregoing components adhere to the following roller or the like, causing another problem to arise in that an adverse influence is exerted on the roller or the like.

A portion of the foregoing dry systems has a structure that the recording material is conveyed while the recording material is being pressed against the side surface of the plate heater by the pressing roller or the like so as to perform the heat development. Since the plate heater is heated to a high level of 100° C. or higher, also the recording material immediately after it has been subjected to the heat development is heated to a high level.

Therefore, when the recording material is naturally cooled, a long time is required for the recording material to be cooled. Moreover, the temperature in the apparatus changes the time required for the development operation to be interrupted. It leads to a fact that the developed image has a difference in the density (irregular density). Thus, a variety of problems have been raised.

To solve the foregoing problems, a variety of suggestions have been made. For example, an "improved heat development method" disclosed in Japanese Patent Laid-Open No. 3-208048 has a cooling step for cooling a photosensitive material subjected to the heat development.

However, only the cooling step is insufficient to form an image having a high quality free from irregular density. A fact has been found that uniform and stable cooling is required to form an image having a high quality.

Moreover, another fact has been found that inadequate cooling temperatures cause creases of the recording material to occur in a process from the heat development to the cooling step. In this case, flatness deteriorates. What is worse, a fat and oil component vaporizes when the recording material is heated. If the fat and oil component is not cleaned off the component adheres to the recording material and, therefore, the quality of the image deteriorates.

SUMMARY OF THE INVENTION

In view of the foregoing, an object of the present invention is to provide a heat development apparatus which is capable of forming an image having a high quality, free from irregular density, by uniformly heating a heated recording material and preventing the occurrence of creases and deterioration in the quality of the image caused from a fat and oil component allowed to adhere to the roller To achieve the foregoing object, in this invention, there is provided a heat development apparatus incorporating an image exposing section for forming a latent image by exposing a recording material; and a heat development section for performing development by subjecting the recording material on which the latent image has been formed to heat treatment, the heat development apparatus comprising: a cooling section incorporating heat transmitting rollers which cool the recording material to a temperature not higher than a development interruption temperature during movement of the recording material subjected to the heat treatment.

The heat development apparatus having the above-mentioned structure causes the recording material subjected to the heat treatment in the heat development section to be cooled to a temperature not higher than the development interruption temperature by dint of heat exchange during the conveyance of the recording material such that the recording material is held between the rollers constituting the cooling section. Thus, a crease and irregular development usually experienced with the recording material can be prevented.

As the rollers, metal rollers with which heat exchange can satisfactorily be performed or elastic rollers for cleaning fat and oil components produced from the recording material are employd.

As an alternative to the rollers, a belt may be employed. The rollers or the belt may be cooled by a cooling means, such as cold water or cold air.

The plate heater for constituting the heat development section may be divided to set the temperature of the rearmost plate heater such that the temperature of the recording material is lowered to a lowermost temperature at which development is interrupted or a temperature not higher than the lowermost temperature at which development is interrupted. Thus, a crease and irregular development which is usually experienced with the recording material can be prevented.

When the plural cooling rollers are disposed in the zigzag arrangement, the cooling efficiency can be improved. When the plural cooling rollers are disposed to satisfy a predetermined curvature, dispersion of the amount of curl can be prevented if change somewhat in the temperature move a the cooling section in the vicinity of 70° C. to the upstream or downstream portion.

When the adjustment of the temperature of the cooling section is performed by the temperature adjustment unit, a predetermined temperature can be maintained in the cooling section.

When the felt is spirally wound around the surface of the cooling roller, defective cooling in the joint portion can be prevented. Thus, stripes can be made inconspicuous.

When the cooling roller is constituted by the metal pipe and the bearings at the two ends are made of the resin, the heat capacity of the cooling roller can be minimized.

Moreover, the difference of the temperature of the roller between the moment immediately after the operation of the apparatus has been started and a running period of time can be reduced. In addition, the temperature of the roller can be saturated after passage of a first plurality of sheets. Since the bearings at the two ends are made of the resin, undesirable heat discharge can be prevented.

Since the cooling roller is covered with the heat insulating cover and a multiplicity of vent holes are provided for the downstream portion of the heat insulating cover, the cooling effect of the downstream portion can be improved. Thus, approach to the portion near 70° C. can quickly be realized at which the curl of the sheet is determined.

DESCRIPTION OF THE PREFERRED EMBODIMENTS

Embodiments of a heat development apparatus according to the present invention will now be described.

Figure 1:
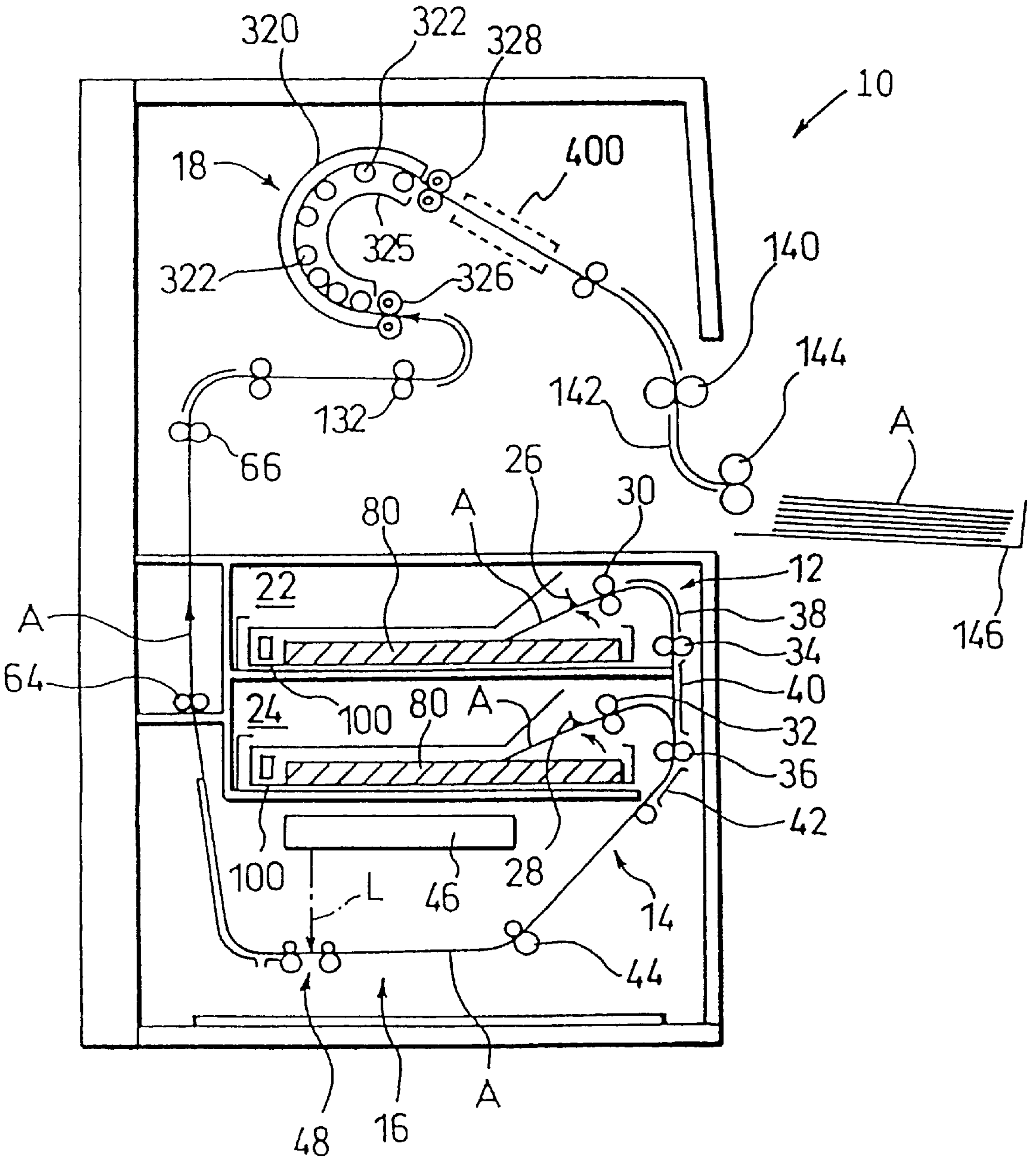
FIG. 1 PRIOR ART
FIG. 1 is a schematic view showing the structure of a heat development apparatus according to the present invention.
Figure 2:
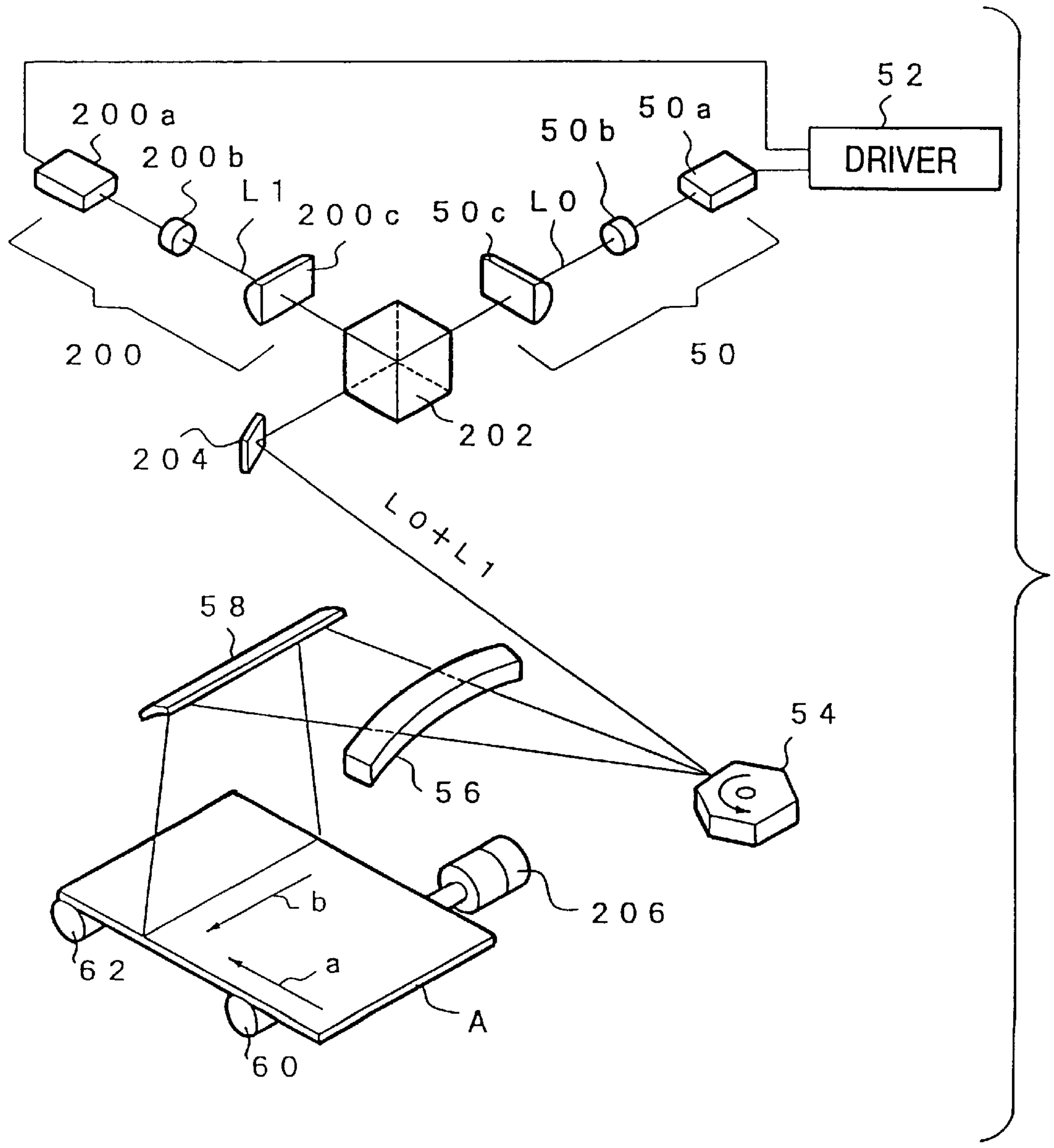
FIG. 2 PRIOR ART
FIG. 2 is a schematic view showing the structure of an image exposing section.
Figure 3:
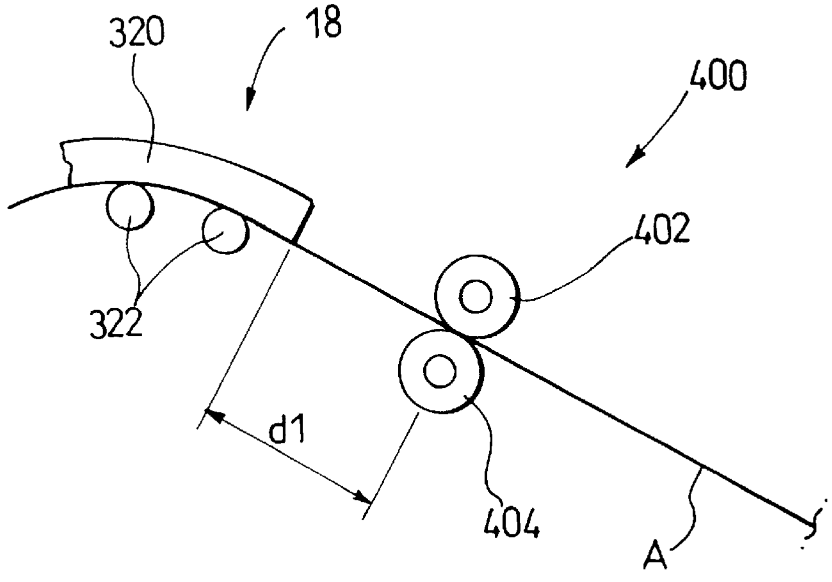
FIG. 3 is a schematic view showing the structure of a cooling section according to a first embodiment of the present invention.

FIG. 1 is a diagram schematically showing the overall structure of a conventional heat development apparatus. A structure formed by adding a cooling section 400 enclosed in a dashed line is the structure of the present invention. FIGS. 3 and following drawings are diagrams showing the embodiments of the present invention.

An image forming apparatus 10 according to the present invention incorporates a recording-material supply section 12, a width aligning section 14, an image exposing section 16, a heat development section 18 and a cooling section 400 disposed sequentially in a passage through which recording material A is conveyed. That is, the characteristic lies in that the cooling section 400 for cooling the recording material A is formed between an outlet portion (in the downstream portion) of the heat development section 18 and the conveying roller pair 140. Another characteristic lies in that the cooling section 400 has a function of cleaning the fat and oil components.

The cooling section 400 may be modified variously as shown in FIG. 3 and so forth. A first embodiment of the present invention shown in FIG. 3 will now be described.

The cooling section 400 uses heat exchange to cool the recording material A during passage of the recording material A which has been subjected to heat treatment performed in the heat development section 18. The cooling section 400 according to this embodiment incorporates paired metal rollers 402 and 404 to lower the recording material A to a temperature not higher than a development interruption temperature. The temperature of the recording material A is usually about 100° C. to 150° C. immediately after the heat development operation has been completed. If the recording material A is cooled to about 70° C. to about 110° C. by the cooling section 400, the development reaction in the recording material A can be interrupted. Thus, a stable image free from an influence of an external environmental temperature can be obtained.

It is preferable that the distance d1 from an end of the heat development section 18 and the paired rollers 402 and 404 is shortened minimally to prevent an influence of the temperature in the image forming apparatus 10. It is preferable that the distance d1 satisfies, for example, a range from about 20 mm to about 100 mm.

The speed at which the recording material A is conveyed is appropriately determined in consideration of the number of sheets which must be processed per unit time and the length of the heat development section 18. Preferred speed is, for example, 10 mm/sec to 50 mm/sec. The preferred outer diameter of each of the paired rollers 402 and 404 is 15 mm to 30 mm in consideration of the foregoing conveyance speed of the recording material A.

As described above, the cooling section 400 shown in FIG. 3 incorporates the paired rollers 402 and 404 which are metal rollers. Thus, the temperature is lowered to the foregoing level during conveyance of the recording material A subjected to the heat treatment in a state in which the rollers hold the recording material A therebetween. Since the metal rollers exhibit excellent heat conductivity and arranged to be brought into intimate contact with the overall width of the recording material A during the conveyance, the heat of the recording material A can efficiently be derived. As a result, an excellent cooling effect can be obtained. That is, the recording material A can efficiently be cooled to the foregoing temperature during the conveyance of the recording material A in the cooling section 400.

If both of the paired rollers 402 and 404 are made of metal, foreign matter, such as dust, is sometimes trapped by the rollers 402 and 404. It leads to a fact that the recording material A encounters irregular density in the form of stripes.

Figure 4:
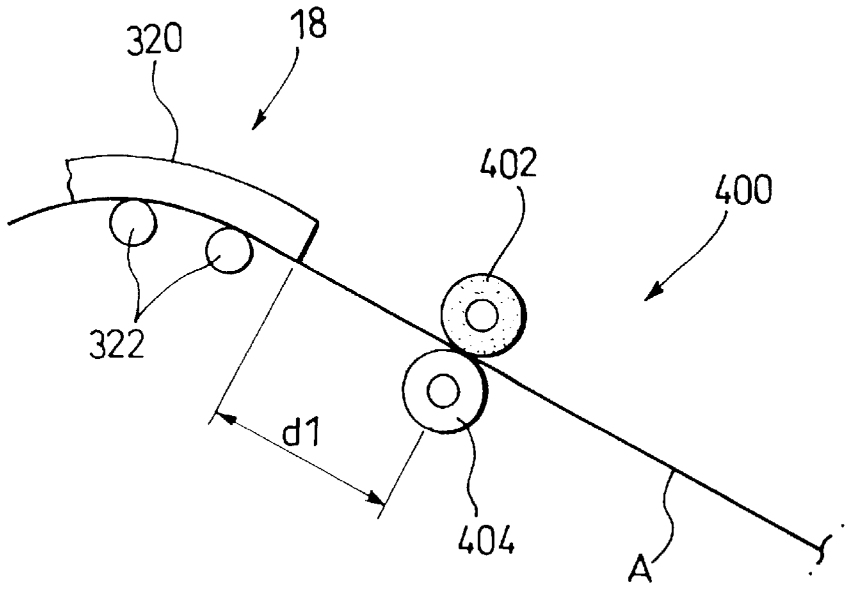
FIG. 4 is a schematic view showing the cooling section having modified rollers.

Therefore, as shown in FIG. 4, the roller 404 is made of metal, while the other roller 402 is changed to a roller having an elastic surface, for example, a rubber roller or a sponge roller. If foreign matter is moved to the roller 402 or 404, the foregoing structure causes the foreign matter to pass through a space between the rollers 402 and 404. Therefore, formation of the irregular density in the form of the stripes can be prevented.

The conventional structure has experienced with another problem in that a fat and oil component (in the form of gas or the like) is vaporized from the recording material A during the heat development process and, therefore, stripe irregularity occurs if the fat and oil component adheres to the metal roller 404. To solve the foregoing problem, the roller 402 is made of the elastic material to have an effect of cleaning the metal roller 404. Therefore, the fat and oil component allowed to adhere to the metal roller 404 during non-passage of the recording material A can be removed by the elastic roller 402. Thus, stripe irregularity caused from the metal roller 404 can be prevented.

The elastic surface layer of the roller 402 made of the elastic material may be formed into a structure which can be attached/detached, if necessary. The paired rollers 402 and 404 may be rotated by a rotating means or may be free from the means.

Figure 5:
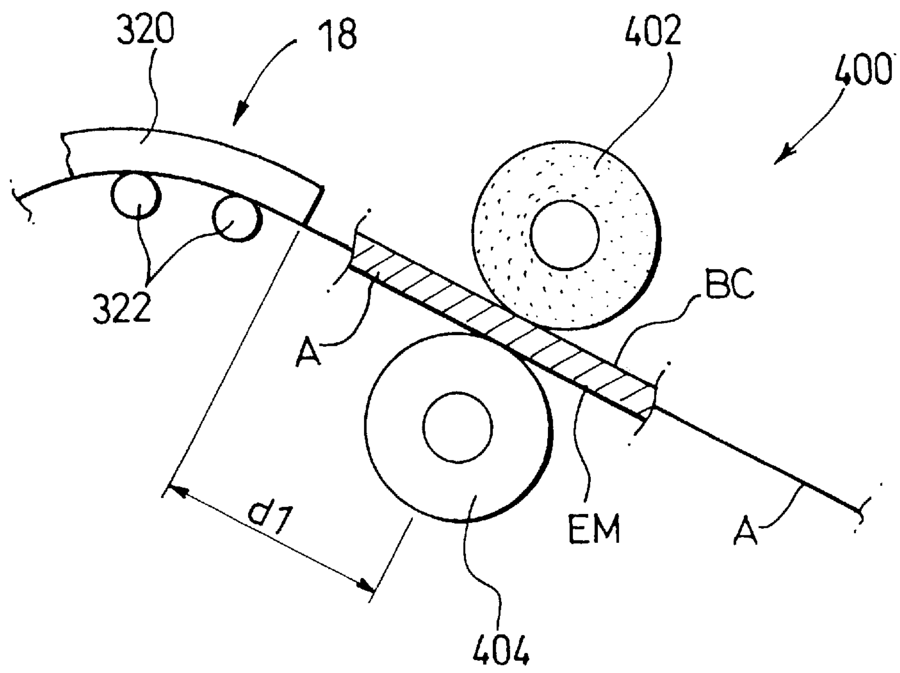
FIG. 5 is a partially-enlarged view of the portion shown in FIG. 4.

FIG. 5 is a partially-enlarged view showing a portion of the recording material A shown in FIG. 4. It is preferable that a structure is employed in which a surface of an emulsion FM layer, which is the photosensitive surface of the recording material A, which is the image forming surface, is brought into contact with the metal roller 404. Moreover, a backcoat BC surface, which is a non-photosensitive surface, is brought into contact with the elastic roller 402. The foregoing structure is able to lower the temperature of the recording material A to the development interruption temperature or lower in a short time.

The distance d1 between the end of the heat development section 18 and the paired rollers 402 and 404 is the same as that of the structure shown in FIG. 3. Therefore, it is preferable that the foregoing distance is shortened minimally to prevent influence of the temperature in the image forming apparatus 10. It is preferable that the distance d1 satisfies a range from about 20 mm to about 100 mm.

The speed at which the recording material As is conveyed is appropriately determined in consideration of the number of sheets which must be processed per unit time and the length of the heat development section 18. Preferred conveyance speed is, for example, 10 mm/sec to 50 mm/sec. It is preferable that the outer diameter of each of the paired rollers 402 and 404 satisfies a range from 15 mm to 30 mm in consideration of the conveyance speed of the recording material A.

The cooling section 400 having the above-mentioned structure may be formed as shown in FIGS. 6 to 12.

Figure 6:
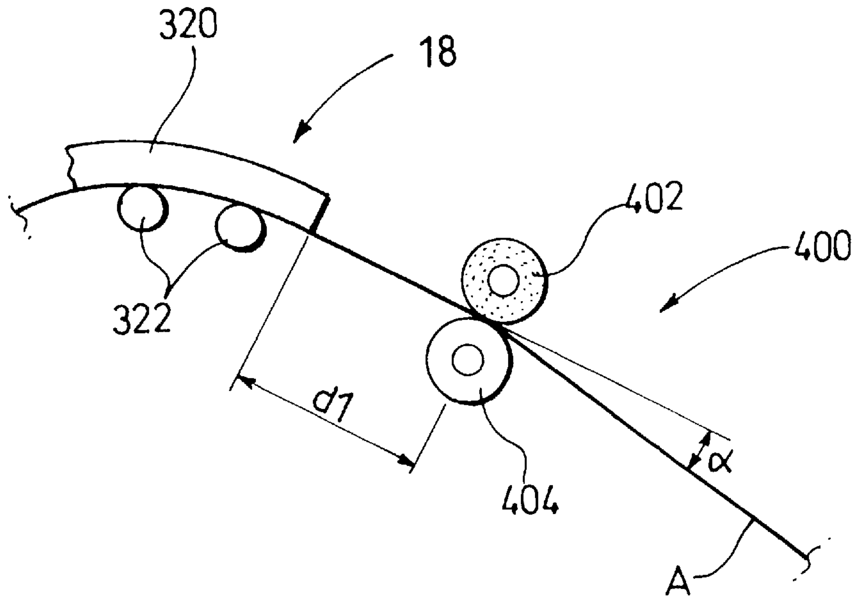
FIG. 6 is a schematic view showing another example of the structure of the cooling section.

The structure shown in FIG. 6 is arranged to further quickly cool the recording material A. That is, when the recording material A is conveyed to a downstream position from the paired rollers 402 and 404, a lapping angle $\alpha$ is set. Since the distance of winding the recording material A around the metal roller 404 can be elongated in a quantity corresponding to the lapping angle $\alpha$, cooling is performed more efficiently. If the lapping angle $\alpha$ is enlarged excessively cooling is performed too quickly and, therefore, a curl or a crease of the recording material A occurs. Thus, the flatness deteriorates. Therefore, it is preferable that the lapping angle satisfies a range $0 \leqq \alpha \leqq 5°$.

Figure 7:
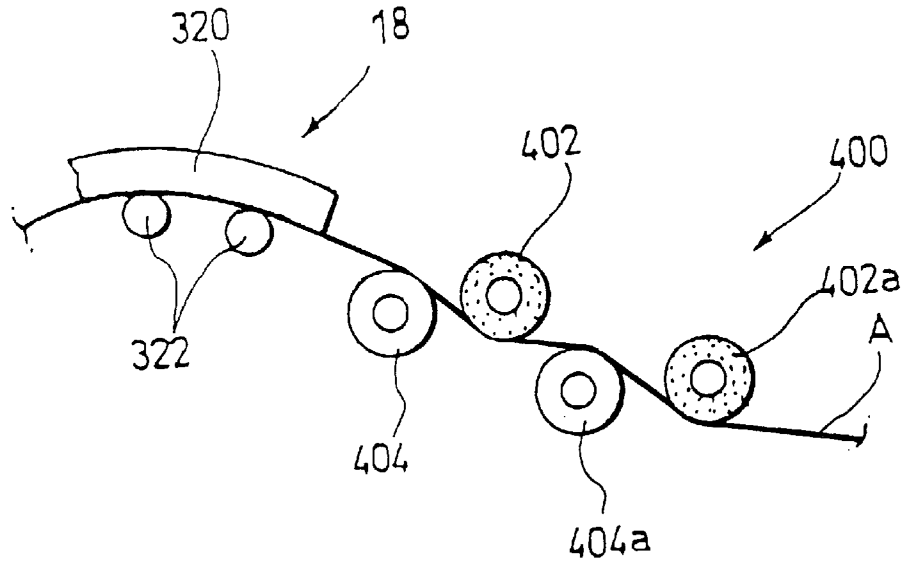
FIG. 7 is a schematic view showing the cooling section having an example of the arrangement of the rollers.

A structure shown in FIG. 7 is formed such that plural rollers 402 and 404 are disposed in a zigzag arrangement. The paired rollers 402*a* and 404*a* added in this structure may be metal rollers, rubber rollers or resin rollers.

The zigzag arrangement enables the distance for which the recording material A is wound around the rollers 402, 404, 402*a* and 404*a* made of metal or the like to be elongated to an extent corresponding to the lapping angle. Thus, time for which the recording material A and the rollers are made with each other is elongated. Therefore, the cooling effect can furthermore be improved. Since the recording material A is alternately wound in opposite directions, a curl and a crease can be prevented and the flatness can be maintained.

Figure 8:
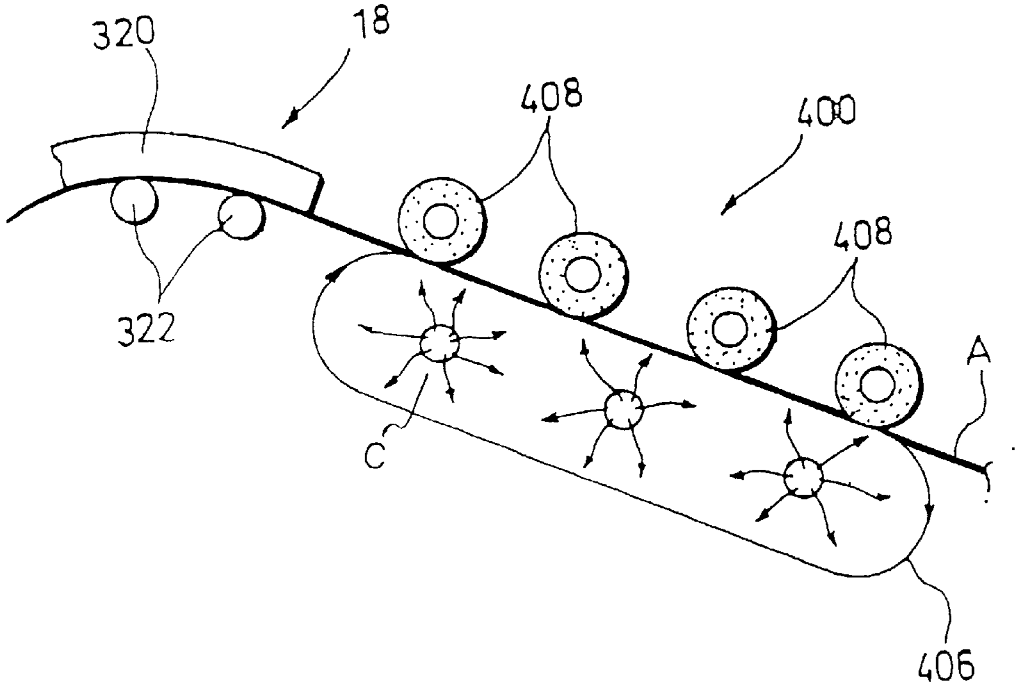
FIG. 8 is a schematic view showing a cooling section incorporating a belt.

The structure shown in FIG. 8 is formed such that an endless belt 406 is substituted for the roller 404. Moreover, a pressing roller 408 for pressing the recording material A against the endless belt 406 is provided. The endless belt 406 is made of metal having satisfactory heat conductivity or rubber or resin having elasticity. The rotating speed in the clockwise direction is set to be the same as the conveyance speed of the recording material A or different from the same. It is preferable that the material of the pressing roller 408 is rubber or resin having elasticity when the endless belt 406 is made of metal. When the endless belt 406 is made of rubber or resin, it is preferable that the pressing roller 408 is made of metal having excellent heat conductivity.

When the endless belt 406 is a metal endless belt 406 having excellent heat conductivity, an air cooling unit C, such as a cooling fan, is operated to cool the recording material A during the rotation which is performed as described above. As a result, the recording material A is conveyed while it is being pressed against the endless belt 406 by the pressing roller 408 and cooled as described above.

The foregoing structure enables the time for which the recording material A and the endless belt 406 contact each other to be elongated. Thus, the cooling effect can be improved. Since the endless belt 406 is cooled, a predetermined temperature of the recording material A at the supply end of the recording material A can be maintained. Therefore, an effect can be obtained in that cooling can always stably be performed under predetermined conditions.

When the recording material A is not conveyed, the surface of the endless belt 406 is cleaned by the pressing roller 408. Therefore, an adverse influence of the fat and oil component can be prevented.

Figure 9:
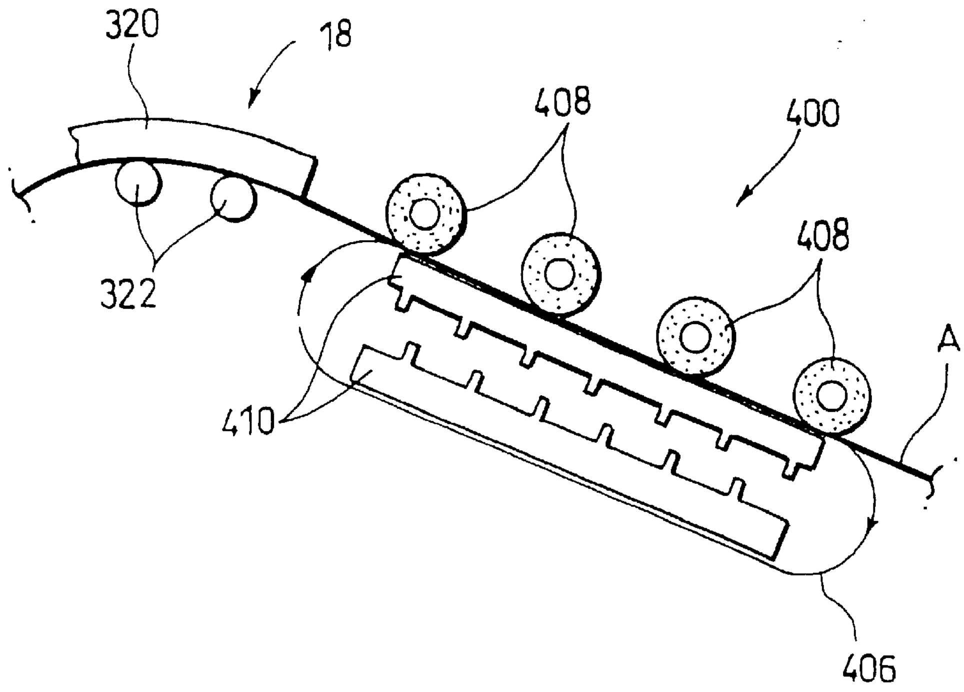
FIG. 9 is a schematic view showing another example of the structure of the cooling section incorporating the belt.

A structure shown in FIG. 9 is formed such that a metal block 410 having cooling fins is provided for the inside portion of the endless belt 406. The foregoing structure causes the recording material A to be conveyed while the same is being pressed against the endless belt 406 by the pressing roller 408 similarly to the foregoing structure, heat conducted from the recording material A to the pressing roller 408 is radiated by the metal block 410 having cooling fins. Therefore, the temperature of the recording material A can effectively be lowered.

Figure 10:
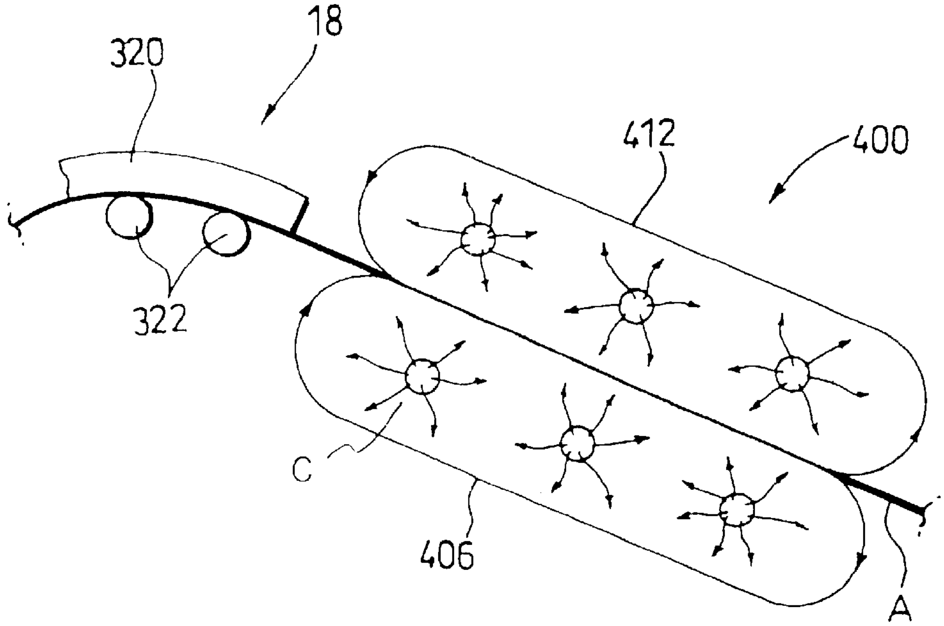
FIG. 10 is a schematic view showing another example of the structure of the cooling section incorporating the belt.

A structure shown in FIG. 10 is formed such that the endless belt 406 which is rotated clockwise and an endless belt 412 which is rotated counterclockwise are provided. Thus, the recording material A is conveyed while the upper and lower surfaces of the recording material A are being pressed. The endless belts 406 and 412 are cooled by the cooling unit C, such as the cooling fan, similarly to the structure shown in FIG. 8. As an alternative to this, the endless belts 406 and 412 are cooled by the radiating metal block having the radiating fins, similarly to the structure shown in FIG. 9.

The foregoing structure enables radiation of the recording material A to furthermore effectively be performed. Moreover, the recording material A can always be cooled under predetermined conditions.

Figure 11:
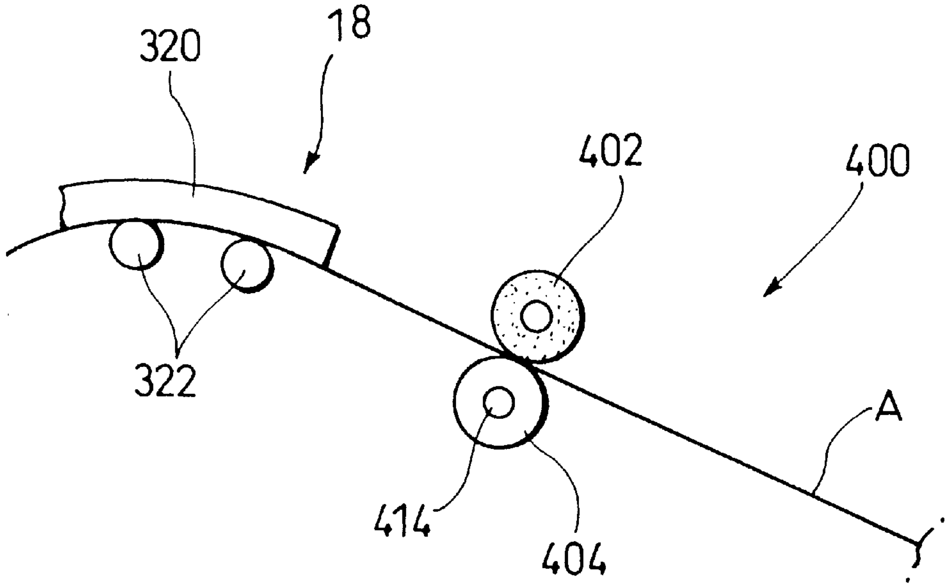
FIG. 11 is a schematic view showing an example of cooling using the rollers.

A structure shown in FIG. 11 is formed such that a heat pipe 414 is provided for the inside portion of the metal roller 404 to cool the roller 404. The heat pipe 414 incorporates a pipe made of aluminum, stainless steel or copper having the inner surface applied with a wick member made of glass fiber or thin copper wire in the form of a net. The internal pressure of the heat pipe 414 is reduced to transfer heat by using movement of vapor of a heat medium, such as freon, ammonia or water and latent heat of the vaporization. When the heat pipe 414 is employed, heat in the roller 404 can efficiency be discharged to the outside air.

Figure 12:
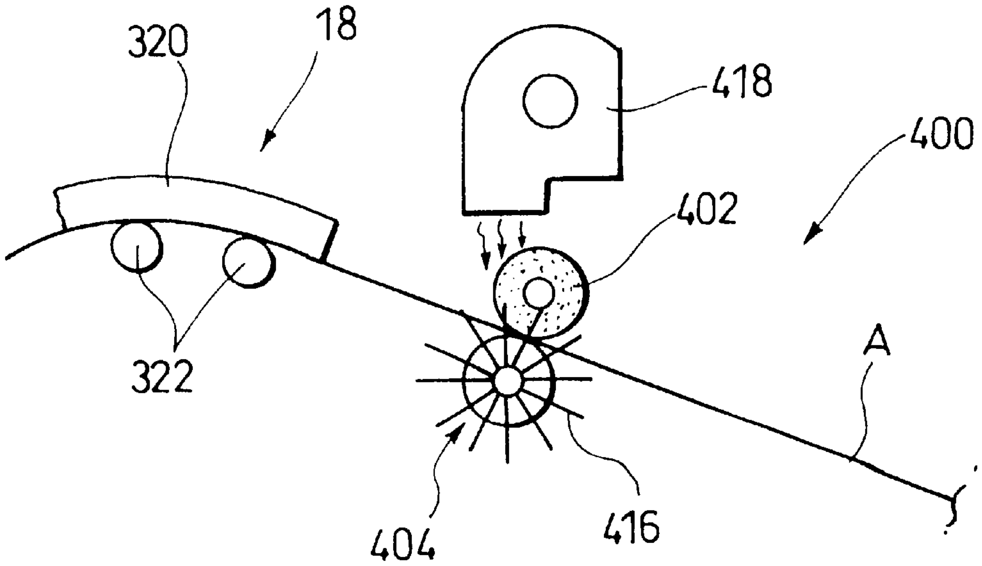
FIG. 12 is a schematic view showing another example of cooling using the rollers.

As shown in FIG. 12, cooling fins 416 are provided for an end of a roller shaft. Air is supplied by a fan 418 to cool the roller 404. The foregoing structure is able to efficiently cool the roller 404 and rise in the temperature can be prevented. Therefore, the recording material A can efficiency and stably be cooled.

Figure 13:
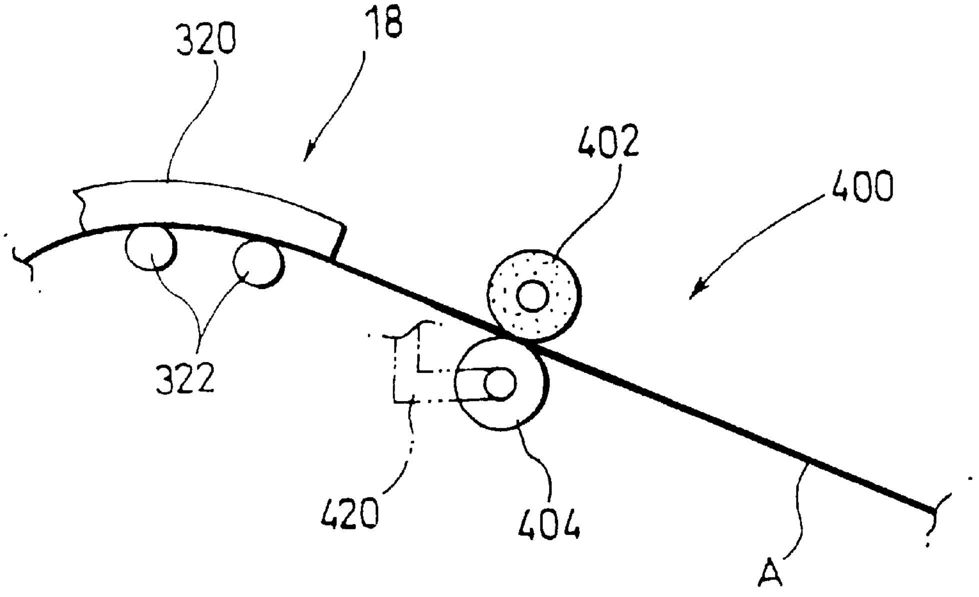
FIG. 13 is a schematic view showing another example of cooling using the rollers.

The roller 404 may be cooled as shown in FIG. 13 such that a support shaft for the roller 404 is formed into a pipe shape which includes a connected pipe 420 to permit supply of air, cold water or a refrigerant.

Figure 14:
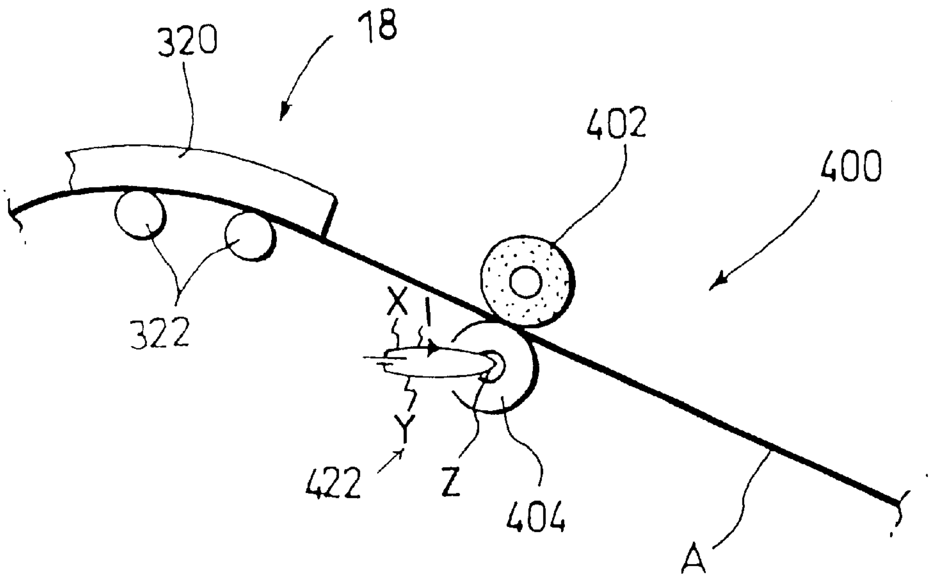
FIG. 14 is a schematic view showing another example of cooling using the rollers.

As schematically shown in FIG. 14, an electronic cooling device 422 using a Peltier elect may be provided. That is, the electronic cooling device 422 uses a fact that heat absorption occurs in a joint portion Z when a thermocouple composed of different metal materials X and Y is supplied with electric current I while a predetermined temperature is being maintained. The joint portion Z is accommodated in the roller 404 so that the roller 404 is easily cooled.

Referring to FIGS. 15 to 18, a second embodiment of the present invention will now be described.

Figure 15:
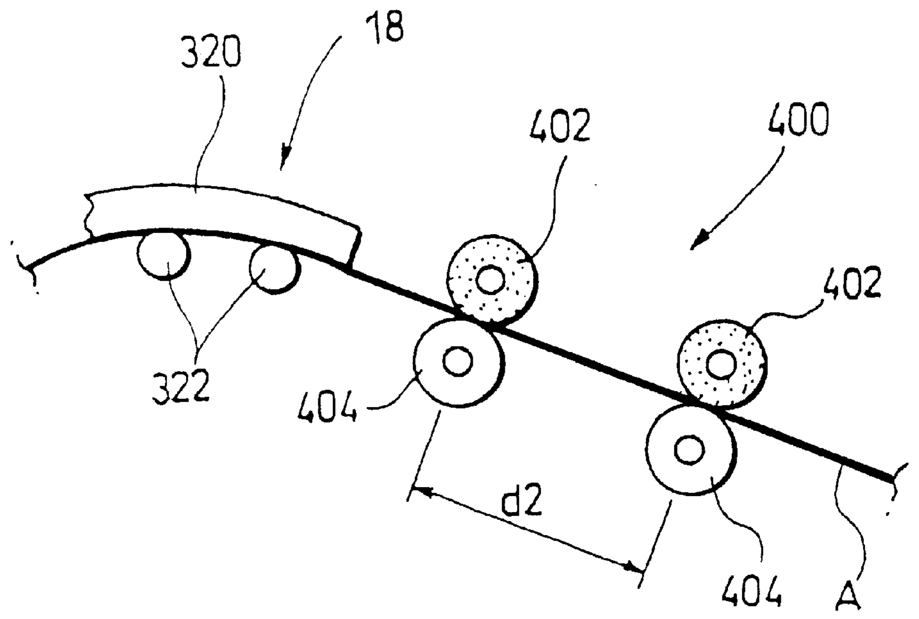
FIG. 15 is a schematic view showing the structure of a cooling section according to a second embodiment of the present invention.

In consideration of the conveyance speed of the recording material A and the cooling performance of the paired rollers, a structure as shown in FIG. 15 may be employed in which a plurality of roller pairs are provided. That is, paired rollers 402 and 404 are disposed apart from each other for distance d2. To prevent an influence of the environmental temperature in the apparatus, it is preferable that the distance d2 is minimized. It is preferable that the distance d2 satisfies a range from 20 mm to 100 mm.

The temperature of the recording material A has been lowered to the development interruption temperature or lower at the outlet portion of the paired rollers 402 and 404 in the rear portion. Therefore, cooling can be realized without great influence of the environmental temperature (the temperature in the apparatus depends on the environmental temperature).

Figure 16:
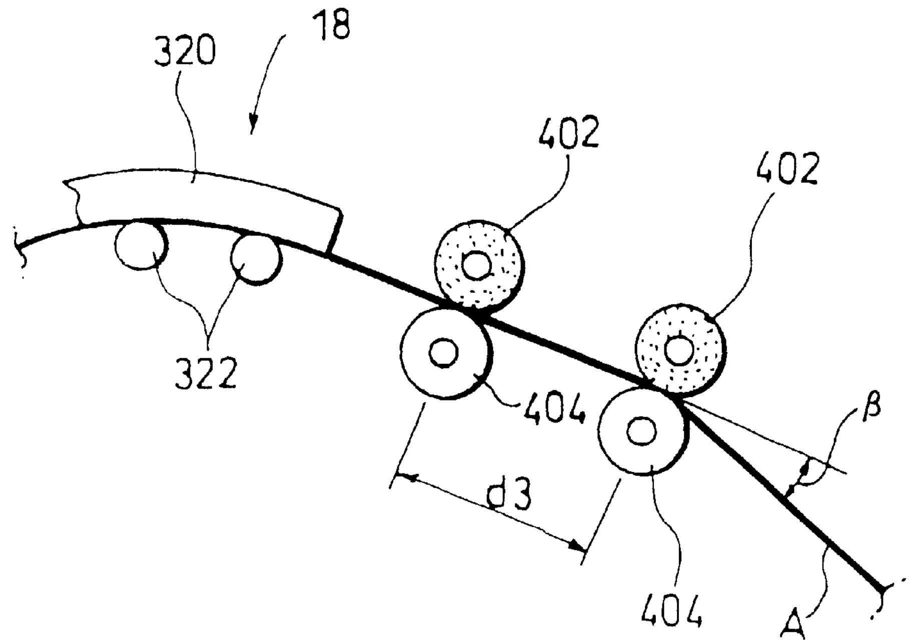
FIG. 16 is a schematic view showing another example of the structure of the cooling section.

A structure shown in FIG. 16 is formed such that the paired rollers 402 and 404 are disposed apart from each other for distance d3. The plurality roller pairs are used to lower the temperature of the recording material A to the development interruption temperature or lower. Moreover, the temperature is lowered to a level not higher than the glass-transition temperature (Tg) of the base of the recording material A.

Since the temperature of the recording material A is usually about 100° C. to 150° C. immediately after the heat development has been completed, the paired rollers 402 and 404 which constitute a front cooling means are operated to lower the temperature to about 70° C. to about 110° C. Then, the paired rollers 402 and 404 which are disposed distant from the front paired rollers 402 and 404 for a distance d3 and which constitute a rear cooling means, are operated to lower the temperature to about 40° C. to 90° C. As described above, so-called two set paired rollers are used to cool the recording material A so that the development reactions in the recording material A are interrupted. As a result, a stable image can be obtained without an influence of the external environmental. Moreover, the flatness of the recording material A can be maintained. That is, a crease and undesirable folding can be prevented. Moreover, the length of the cooling section 400 can be shortened.

Since lapping angle β is provided at the outlet portion of the paired rollers 402 and 404 in the rear portion to realize quick cooling, the distance d3 of the cooling section 400 is shorter than the distance d2. As a result, uniform cooling free from an influence of the environmental temperature can be performed.

Similarly to the structure described with reference to FIG. 6, the foregoing structure is able to cool the recording material A in a shorter time. If cooling is performed too quickly, a curl of the recording material A occurs. Therefore, the preferred range is $0 \leqq \beta \leqq 5°$.

It is preferable that the outer diameter of each of the pairs of the paired rollers 402 and 404 satisfies a range from 15 mm to 30 mm in consideration of the cooling performance.

Figure 17:
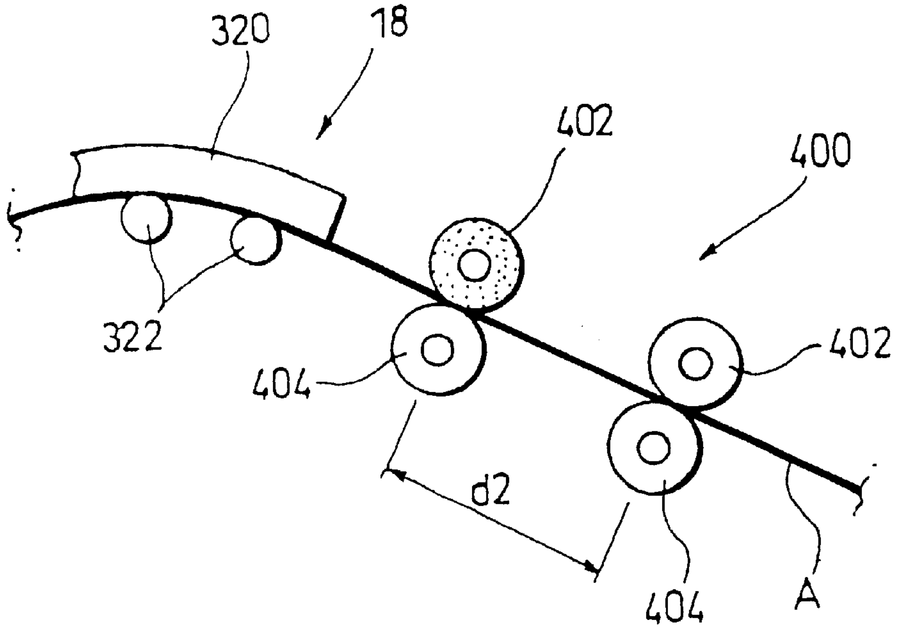
FIG. 17 is a schematic view showing another example of the structure of the rollers.

To prevent irregular density of the recording material A, the two pairs of rollers 402 and 404 are disposed apart from each other for the distance d2, as shown in FIG. 17. Similarly to the first embodiment, it is preferable that the metal roller and the elastic roller are combined with each other.

The temperature of the recording material A has been lowered to the development interruption temperature or lower at the outlet portion of the paired rollers 402 and 404 in the rear portion. Therefore, no irregular density occurs in a portion following the paired rollers 402 and 404 in the rear portion. Therefore, both of the two pairs of the rollers 402 and 404 may be metal rollers.

The two pairs of the rollers 402 and 404 may be structured to selectively use the foregoing cooling which uses the heat pipe cooling using, cold air, cold water or refrigerant or electronic cooling which uses the Peltier effect.

Figure 18:
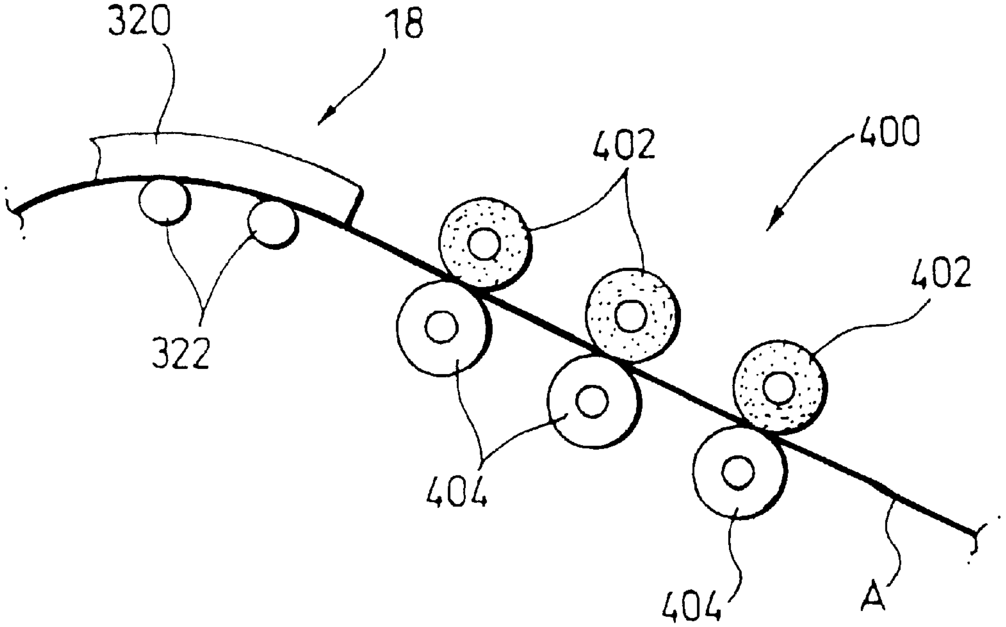
FIG. 18 is a schematic view showing another example of the structure of the rollers.

A structure shown in FIG. 18 is formed to provide a plurality of pairs of the rollers for the rear portion in consideration of the conveyance speed of the recording material A and the cooling performance of the paired rollers. Since the plural pairs of the paired rollers are provided, the temperature of the base of the recording material A can be lowered to the glass-transition temperature of the recording material A at the outlet portion of the third pair of the rollers 402 and 404.

Therefore, the flatness of the recording material A can be maintained in a portion following the third pair of the rollers if the direction in which the recording material A is conveyed is changed. Therefore, an image having a high quality can be formed.

Figure 19:
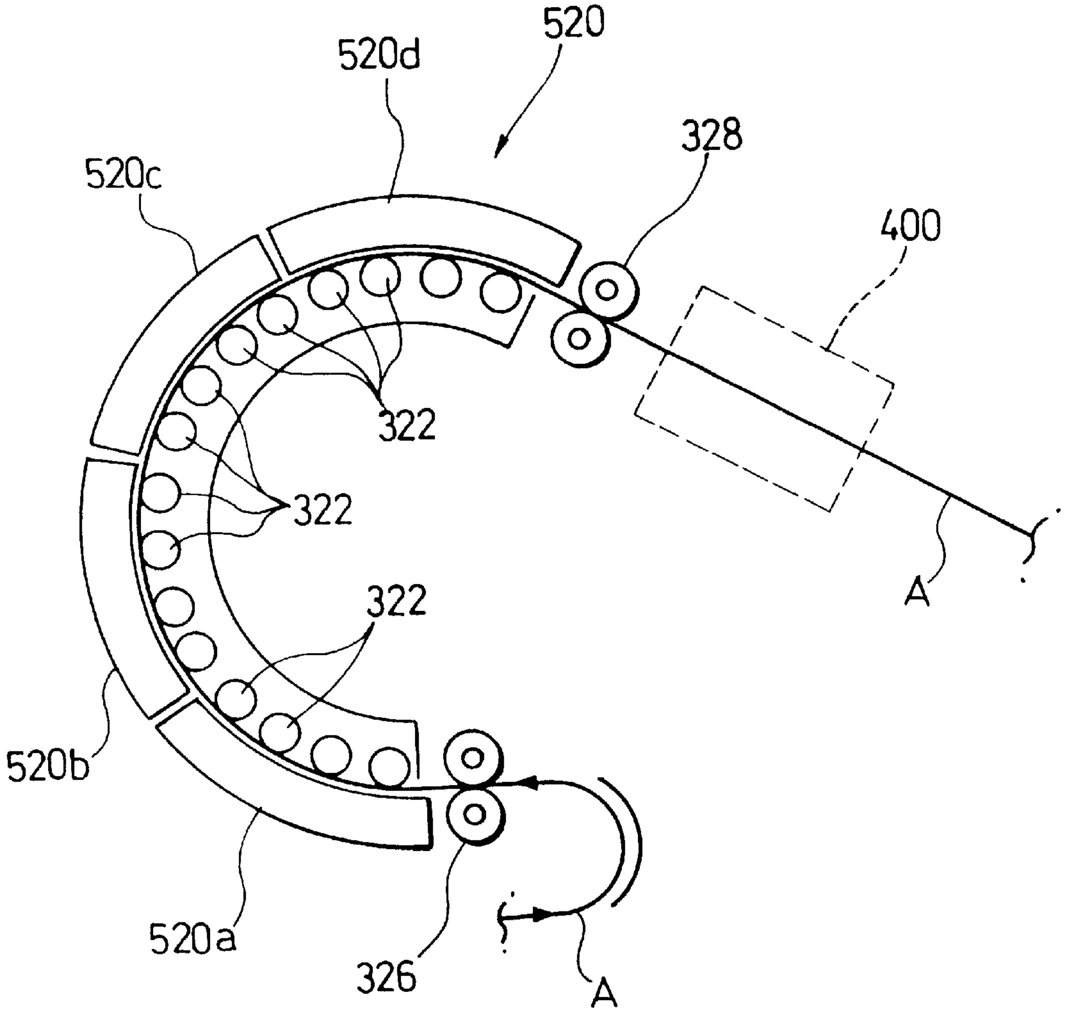
FIG. 19 is a schematic view showing the structure of a heat development section according to a third embodiment of the present invention.

A third embodiment of the present invention will now be described with reference to FIG. 19.

This embodiment is formed to prevent a crease of the recording material A which easily occurs after the recording material A has been subjected to the heat development. The image forming apparatus 10 shown in FIG. 1 incorporates the plate heater 320 which is a sole circular-arc member. In this embodiment, a plate heater 520 is divided into four sections. As compared with the plate heater 320 having the overall length of 400 mm, this embodiment has a structure that the length of each of plate heaters 520*a*, 520*b*, 520*c* and 520*d* is about 100 mm. The inner surfaces of the plate heaters 520*a*, 520*b*, 520*c* and 520*d* are made to form a continuous circular-arc surface after they have been assembled to form the plate heater 520.

Moreover, rollers 322 arranged to perform the same actions as those of the foregoing rollers are successively disposed on the inside of the plate heater 520.

The plate heaters 520*a* to 520*d* are set to 100° C., 120° C., 120° C. and 100° C., respectively. The temperature of 100°

C. set to the final plate heater 520*d* is the lowest temperature which permits the development to be performed.

After the plate heaters 520*a* to 520*d* have been heated to the foregoing set temperatures, 20 half-cut sheets were successively fed at intervals of 8 seconds so as to be developed with heat. Then, the sheets were cooled by the cooling section 400 to observe a state of creases. Satisfactory results were obtained.

Moreover, the plate heater 520 having the above-mentioned structure were arranged such that the plate heaters 520*a* to 520*c* were set to the above-mentioned temperatures. Note that the plate heater 520*d* was set to 90° C. Under the above-mentioned conditions, the heat development was performed. As a result, the half-cut sheets were free from any crease. That is, no crease was formed.

The temperature of 90° C. set to the plate heater 520*d* is the temperature at which the development reaction is interrupted. When the half-cut sheet is lowered to the foregoing temperature, the temperature at the inlet portion of the next cooling section 400 can furthermore be lowered. Thus, formation of a crease was prevented.

Figure 20A:
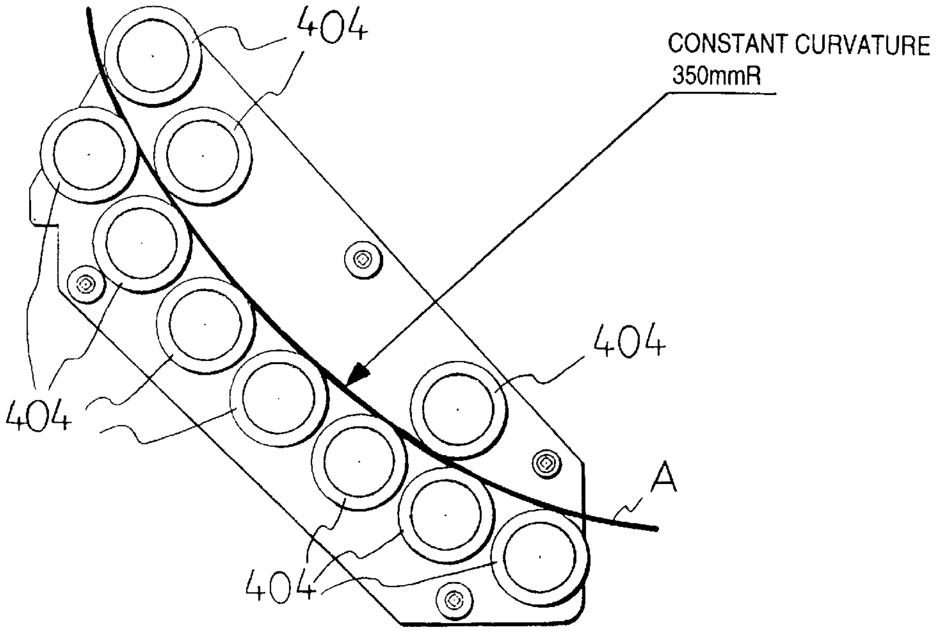
FIGS. 20(*a*) and 20(*b*) shows an arrangement of a plurality of cooling rollers according to a fourth embodiment of the present invention, in which FIG. 20(*a*) is a front view and FIG. 20(*b*) is a perspective view.
Figure 20B:
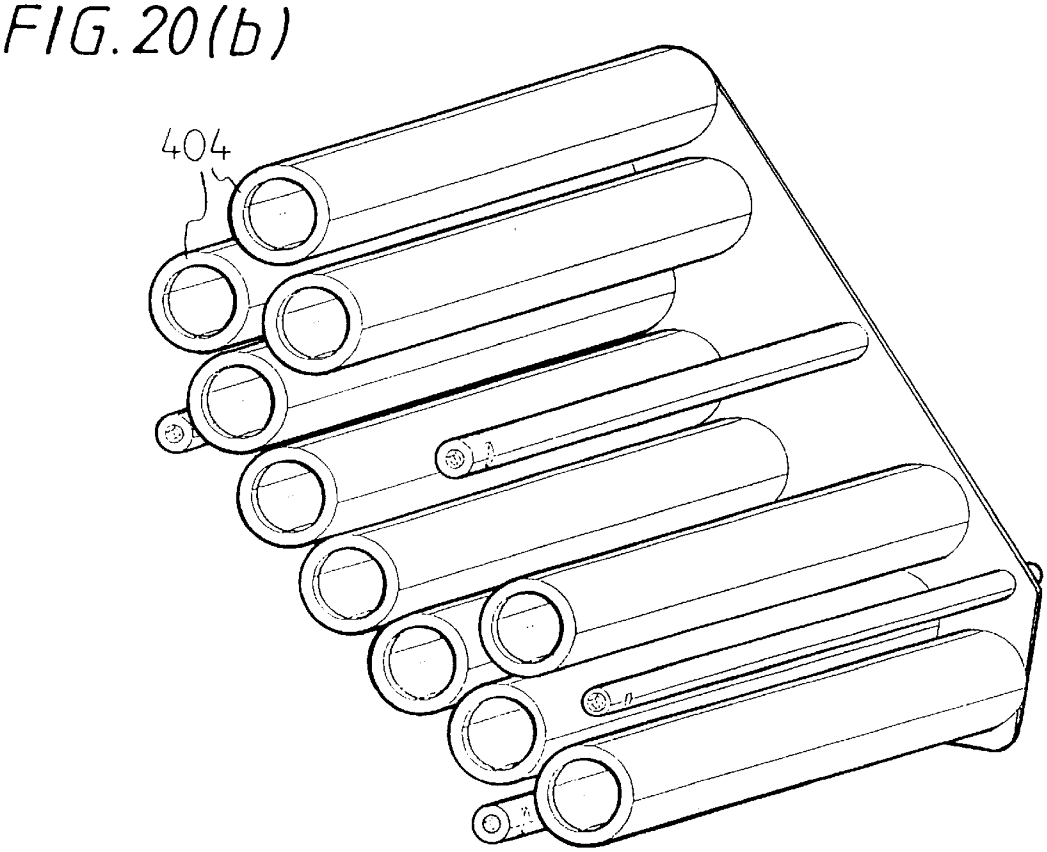

Referring to FIG. 20, a fourth embodiment of the present invention will now be described.

FIG. 20(*a*) is a front view showing the positions of a plurality of cooling rollers according to the fourth embodiment. FIG. 20(*b*) is a perspective view of the same.

Referring to FIG. 20, cooling rollers 404 are disposed above the recording material A and below the same. As an alternative to the opposite arrangement of the upper and lower cooling rollers as shown in FIG. 3, the upper and lower cooling rollers are disposed in a zigzag arrangement. As a result, the time for which the recording material A is made contact with the cooling rollers 404 is elongated as compared with the structure shown in FIG. 3. Thus, the cooling efficiency can be improved.

As an alternative to the straight configuration of the cooling rollers as shown in FIGS. 3 to 19, they are disposed to have a predetermined curvature. That is, the cooling section has two functions.

(1) One of the functions is to quickly lower the temperature to about 100° C. because proceeding of the development reaction is interrupted and to prevent rise in the temperature to a level not lower than the foregoing temperature.

(2) Another function is to enhance cooling so as to quickly lower the temperature to about 70° C. after proceeding of the development has been interrupted because the curl formation is determined at about 70° C.

The transition temperature of the sensitive glass which is the base of the sheet is about 70° C. Therefore, the cooling rollers are disposed to have the above-mentioned predetermined curvature. Thus, even in a state immediately after start of the operation, in a steady state or even if the cooling section about 70° C. is moved upstream or downstream owning to change in the temperature of the cooling section, the cooling operation is always continued at the predetermined curvature. Therefore, dispersion of an amount of a curl can be prevented.

The reason why the sheet is positively curled will now be described.

It is ideal that the discharged sheets are flat. It is difficult to control the temperature to obtain completely flat sheets. Therefore, if the temperature is somewhat changed, a sheet having a curl in the form of a concave or convex has been discharged from the apparatus when the sheet is viewed from an operator. It the sheet discharged from the apparatus is changed to the concave surface or the convex surface owning to the change in the temperature, a problem arises in that, for example, when the discharged sheets are stacked, the sheets cannot properly be stacked and, therefore, gaps or the like are formed. In the foregoing case, the operation cannot easily and smoothly be performed and handling easiness becomes unsatisfactory.

Therefore, the present invention is arranged to curl the sheet which must be discharged in place of performing control to form a flat sheet. To achieve this, a plurality of cooling rollers are disposed to have the predetermined curvature. As a result, even if a change somewhat in the temperature causes the cooling section about 70° C. to be shifted upstream or downstream the cooling state at the predetermined curvature can be maintained. Therefore, the dispersion of the amount of the curl can be prevented. The curl includes a convex curl and a concave curl. The present invention employs a somewhat convex curl of the sheet which must be discharged when the sheet is viewed from the operator. The reason for this lies in that two sides of the sheets having the convex curl can be supported and thus the sheets can stably be supported as compared with the concave curl when the sheets have been placed on the desk. In this case handling can easily be performed by the operator.

Although the curvature radius in this embodiment is made to be 350 mm, the curvature radius is, of course, changed depending on the thickness and the material of the sheet.

Since the recording material A projects downwards in FIG. 20, the conveying roller in the vicinity of the central portion is not required. Thus, an effect can be obtained in that the number of elements can be reduced.

Figure 21:
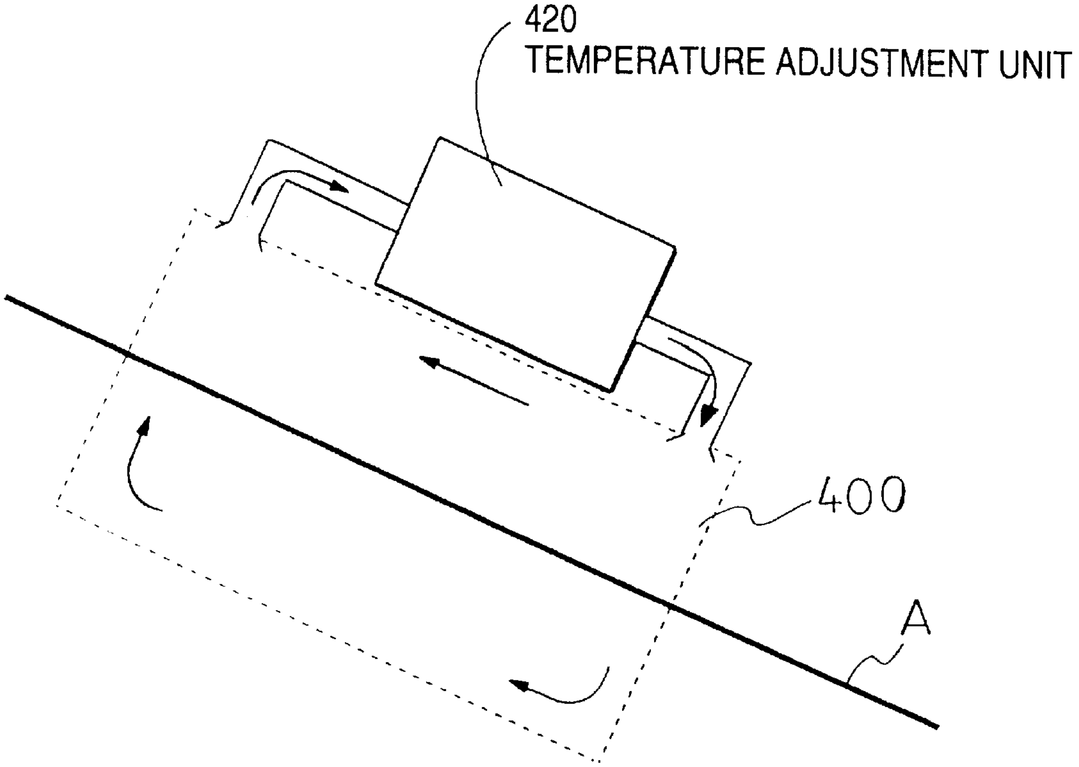
FIG. 21 is a diagram showing a temperature adjustment unit provided for a cooling section according to a fifth embodiment of the present invention.

Referring to FIG. 21, a fifth embodiment of the present invention will now be described.

FIG. 21 is a conceptual view showing adjustment of the temperature ol the cooling section according to the fifth embodiment. Referring to FIG. 21, reference numeral 400 represents a cooling section and 420 represents a temperature adjustment unit. The temperature adjustment unit 420 may be a known unit incorporating a thermosensor, a compressor, a heat exchanger, air-supply fan and so forth. As described above, the fifth embodiment incorporates the temperature adjustment unit 420 with which the temperature is adjusted. The temperature sensor (not shown) is disposed at a certain position in the cooling section 400. If the temperature has been raised to a level higher than a predetermined level, the cooling function is used. If the temperature has been made to a predetermined level, the cooling function is interrupted. Thus, an ON-OF F control is performed.

As described above, the adjustment of the temperature is performed so that the atmospheres of the cooling rollers and the cooling section are adjusted. Thus, the cooling states after the operation of the apparatus has been started and during the operation can be made constant. Therefore, variation in the density can be prevented.

Figure 22:
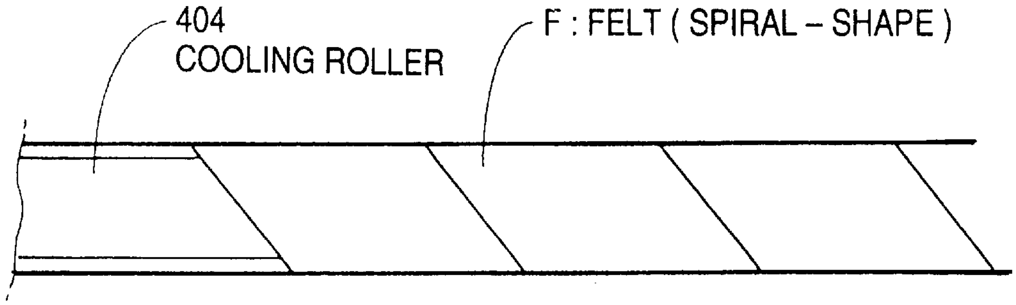
FIG. 22 shows the surface of a cooling roller according to a sixth embodiment of the present invention.

Referring to FIG. 22, a sixth embodiment of the present invention will now be described.

FIG. 22 shows the surface of a cooling roller according to the sixth embodiment.

Referring to FIG. 22, reference numeral 404 represents the cooling roller and symbol F represents felt spirally wound around the surface of the cooling roller 404.

As described above, the sixth embodiment is structured such that the felt F is spirally wound around the surface of the cooling roller 404. The reason why the felt F is wound around the surface of the cooling roller 404 is to obtain a surface, the contact of which is minimized. Ii the felt F is placed on the surface of the cooling roller 404 such that the seam of the felt runs in the axial direction of the cooling roller, one lateral gap is formed in the seam portion. In the gap portion, cooling of the sheet becomes defective and, therefore, deformation takes place. Thus, a somewhat large stripe is formed.

The overall surface of the cooling roller 404 has been filled by a filling technique. The foregoing technique has been performed such that simple and vertical bonding to the surface of the cooling roller 404 using an adhesive agent is carried out. Therefore, removal easily and undesirably occurs.

Therefore, the present invention is structured such that the felt F is spirally wound around the surface of the cooling roller 404. Thus, the defective cooling in the seam portion becomes inconspicuous and, therefore, the stripe becomes inconspicuous. Since the felt F is a pile woven with fibers which are formed in U-turn form separation experienced with the filling technique can be prevented.

Moreover, the conveyance speed of the film and the peripheral speed of the roll are made to be different from each other. Thus, the defective cooling in the seam portion can furthermore be made inconspicuous.

Figure 23:
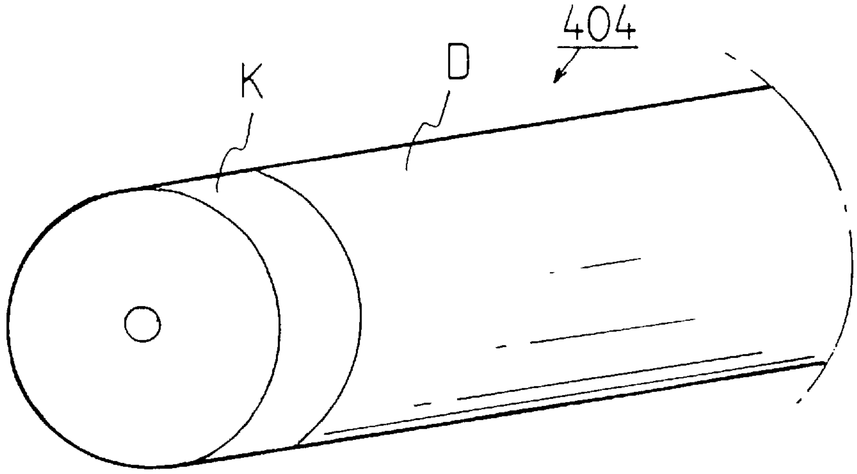
FIG. 23 shows an end of a cooling roller according to a seventh embodiment of the present invention.

Referring to FIG. 23, a seventh embodiment of the present invention will now be described.

FIG. 23 shows an end of a cooling roller according to the seventh embodiment. Referring to FIG. 23, reference numeral 404 represents a cooling roller symbol D represents the body of the cooling roller 404 and K represents resin for constituting a bearing portion of the end of the cooling roller 404.

That is, the seventh embodiment has a structure that the body D of the cooling roller 404 is constituted by a metal pipe. Moreover, the bearing portions K at the two ends are made of resin. As described above, the body D of the cooling roller 404 is constituted by the metal pipe in place of the metal solid member. Thus, the heat capacity of the cooling roller can be minimized, causing the difference between the temperature of the roller immediately after start of the operation and that at the time of running to be minimized. In this embodiment, initial passage of several sheets resulted in saturation of the temperature of the roller.

Since the bearing portions K at the two ends are made of the resin, undesirable radiation of heat to the body of the apparatus can be prevented.

Figure 24:
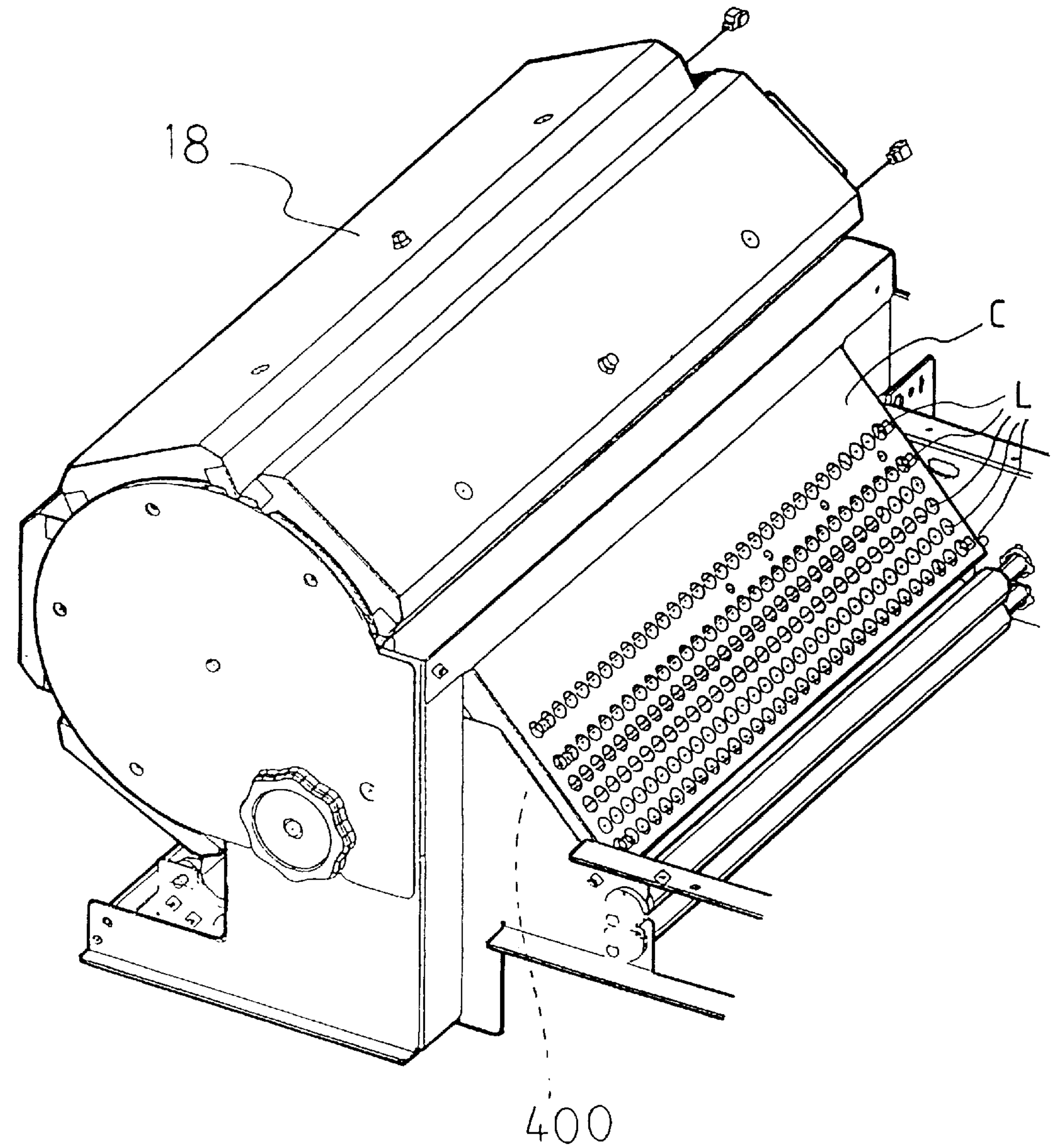
FIG. 24 shows a heat insulating cover of a cooling section according to an eighth embodiment of the present invention.

Referring to FIG. 24, an eighth embodiment of the present invention will now be described.

FIG. 24 is a perspective view showing a heat insulating cover for covering a cooling section according to the eighth embodiment. Referring to FIG. 24, symbol C represents the heat insulating cover.

That is, the eighth embodiment has a structure that the cooling roller 404 is covered with the heat insulating cover C. An upstream portion of the heat insulating cover C in the direction in which the sheet is conveyed is not provided with vent hole L. A multiplicity of vent holes L are formed in the downstream portion.

The reason why the vent hole L is not provided for the upstream portion and the multiplicity of the vent holes L are provided for the downstream portion will now be described. The foregoing two functions of the cooling section must be realized. The two functions are (1) the temperature is quickly made to close to about 100° C. which is the development interruption temperature at the time of start of the operation and the foregoing temperature is maintained; (2) cooling is enhanced to make the temperature close to about 70° C. at which the curl of the sheet is determined. That is, the vent holes L is not provided for the upstream portion so that the upstream portion of the cover can completely be insulated from heat. Therefor, the temperature can quickly be made close to about 100° C. which is the development interruption temperature at the time of start of the operation. Since the multiplicity of the holes are formed in the downstream portion, the cooling effect can be improved. Thus, the temperature can quickly be made close to about 70° C. at which the curl of the sheet is determined.

In this embodiment, six lines are provided in the direction in which the sheet is conveyed and each line has about 40 vent holes L.

As described above, the heat development apparatus according to the present invention incorporates the cooling section in the downstream portion of the heat development section so that the recording material subjected to the heat treatment is cooled to the development interruption temperature or lower. Therefore, irregular density and a crease of the recording material can be prevented. As a result, an image having an excellent quality can be obtained.

The roller pair for constituting the cooling section is arranged such that the metal roller exhibiting satisfactory heat exchanging performance is brought into contact with the image forming surface of the recording material. Moreover, the roller made of the elastic material is brought into contact with the non-image-forming surface. Thus, the foregoing cooling operation is performed and the fat and oil component produced from the color development material can be cleaned off from the recording material. Therefore, an image having an excellent quality can be obtained.

The plate heater for constituting the heat development section is divided in the direction in which the recording material is conveyed. Moreover, the temperature of the final plate heater is set appropriately. As a result, the temperature of the recording material can be lowered to the lower limit for the development reaction or the lower limit of the temperature or lower. Therefore, the temperature has been lowered before the recording material is conveyed to the cooling section. Therefore, formation of creases can furthermore be prevented and, thus, image formation exhibiting excellent flatness can be performed.

The plural cooling rollers are disposed in the zigzag arrangement so that the cooling efficiency is improved. Moreover, the plural cooling rollers are disposed to have a predetermined curvature so that dispersion of the amount of the curl is prevented if a change somewhat in the temperature causes the cooling section about 70° C. to be moved to the upstream portion or the downstream portion.

Since the cooling section is adjusted by the temperature adjustment unit, a predetermined temperature can be maintained in the cooling section.

Since the felt is spirally wound around the surface of the cooling roller, defective cooling can be prevented at the seam portion. Therefore, the stripe becomes inconspicuous. The cooling roller is made of the metal pipe and the bearings at the two ends are made of the resin. As a result, the heat capacity of the cooling roller can be minimized. Therefore, the degree of the difference between the temperature immediately after the start of the operation and that during running can be reduced. Thus, initial passage of several sheets resulted in the saturation of the temperature of the roller. Since the bearings at the two ends are made of the resin, undesirable heat discharge can be prevented.

The cooling roller is covered with the heat insulating cover and a multiplicity of the vent holes are formed downstream of the heat insulating cover. Therefore, the cooling effect of the downstream portion can be improved and the temperature can quickly be made close to about 70° C. at which the curl of the sheet is determined.

What is claimed is:

1. A heat development apparatus, comprising:

an image exposing section for forming a latent image by exposing a recording material;

a heat development section for performing development by subjecting the recording material on which the latent image has been formed to heat treatment; and a cooling section having heat transmitting rollers which cool the recording material to a temperature not higher than a development interruption temperature during movement of the recording material subjected to the heat treatment, wherein said heat development section comprises a plate heater, said plate heater divided in a direction in which the recording material is conveyed, and a temperature of a rearmost plate heater of said divided plate heaters is set so as to lower a temperature of the recording material to a lowermost temperature for a development reaction or a development reaction interruption temperature.

2. A heat development apparatus according to claim 1, further comprising a roller, being provided in addition to said rollers, having an elastic member which cleans fat and oil components off the recording material.

3. A heat development apparatus according to claim 2, wherein two rollers are formed into such a pair structure that one of the paired rollers is a metal roller and the other roller is a roller having the elastic member which cleans fat and oil components off the recording material.

4. A heat development apparatus according to claim 1, wherein an atmospheric temperature of said cooling section is adjusted.

5. A heat development apparatus according to claim 1, wherein felt is spirally wound around a surface of said rolling cooler.

6. A heat development apparatus according to claim 5, wherein said cooling roller has a body constituted by a metal pipe and a bearing section made of resin.

7. A heat development apparatus according to claim 1, wherein a heat insulating cover is joined to said cooling section.

8. A heat development apparatus according to claim 1, wherein a heat insulating cover has a multiplicity of vent holes in a downstream portion.

9. A heat development apparatus according to claim 1, wherein a speed at which said film is conveyed and a peripheral speed of said roller are different from each other.

10. A heat development apparatus, comprising:

an image exposing section for forming a latent image by exposing a recording material;

a heat development section for performing development by subjecting the recording material on which the latent image has been formed to heat treatment; and a cooling section having a heat conductive belt which cools the recording material to a temperature not higher than a development interruption temperature during movement of the recording material subjected to the heat treatment, wherein said heat development section comprises a plate heater, said plate heater divided in a direction in which the recording material is conveyed, and a temperature of a rearmost plate heater of said divided plate heaters is set so as to lower a temperature of the recording material to a lowermost temperature for a development reaction or a development reaction interruption temperature.

11. A heat development apparatus according to claim 10, wherein further comprising a roller, being provided in addition to said rollers, having an elastic member which cleans fat and oil components off the recording material.

12. A heat development apparatus according to claim 10, wherein an atmospheric temperature of said cooling section is adjusted.

13. A heat development apparatus according to claim 10, wherein a heat insulating cover is joined to said cooling section.

14. A heat development apparatus according to claim 10, wherein a heat insulating cover has a multiplicity of vent holes in a downstream portion.

15. A heat development apparatus according to claim 10, wherein a speed at which said film is conveyed and a peripheral speed of said roller are different from each other.

16. A heat development apparatus, comprising:

an image exposing section for forming a latent image by exposing a recording material;

a heat development section for performing development by subjecting the recording material on which the latent image has been formed to heat treatment; and a cooling section arranged to cool the recording material to a temperature not higher than a development interruption temperature during movement of the recording material subjected to the heat treatment by holding the recording material by a plurality of rollers and having rear rollers of said plural rollers which lower the temperature of the recording material to a temperature not higher than a glass transition point of a base of the recording material, wherein said heat development section comprises a plate heater, said plate heater divided in a direction in which the recording material is conveyed, and a temperature of a rearmost plate heater of said divided plate heaters is set so as to lower a temperature of the recording material to a lowermost temperature for a development reaction or a development reaction interruption temperature.

17. A heat development apparatus according to claim 16, wherein an atmospheric temperature of said cooling section is adjusted.

18. A heat development apparatus according to claim 16, wherein felt is spirally wound around a surface of said rolling cooler.

19. A heat development apparatus according to claim 16, wherein a heat insulating cover is joined to said cooling section.

20. A heat development apparatus according to claim 16, wherein a heat insulating cover has a multiplicity of vent holes in a downstream portion.

21. A heat development apparatus according to claim 16, wherein a speed at which said film is conveyed and a peripheral speed of said roller are different from each other.

22. A heat development apparatus according to claim 16, further comprising a cooling section including a plurality of cooling rollers disposed in a zigzag arrangement.

23. A heat development apparatus according to claim 22, wherein the plural cooling rollers are disposed such that the recording material passing over the rollers is subjected to a predetermined curvature.

24. A heat development apparatus according to claim 23, wherein the curvature is one which causes a sheet allowed to pass through said cooling rollers into a convex form.

25. A heat development apparatus according to claim 24, wherein the curvature has a curvature radius of substantially 350 mm.

* * * * *